United States Patent [19]

Spracklen et al.

[11] 3,912,614

[45] Oct. 14, 1975

[54] SENSOR

[75] Inventors: Stanford B. Spracklen, San Juan; Hideo Watanabe Capistiano, Fullerton, both of Calif.

[73] Assignee: International Biophysics Corporation, Irvine, Calif.

[22] Filed: Dec. 10, 1973

[21] Appl. No.: 423,164

Related U.S. Application Data

[63] Continuation of Ser. No. 216,445, Jan. 10, 1972, abandoned.

[52] U.S. Cl............ 204/195 B; 204/1 T; 204/195 P; 204/195 M; 128/2.1 R
[51] Int. Cl.².......................................... G01N 27/46
[58] Field of Search............ 204/1 T, 195 P, 195 M, 204/195 L, 195 B; 128/2.1 R

[56] References Cited
UNITED STATES PATENTS

| | | | |
|---|---|---|---|
| 3,415,730 | 12/1968 | Haddad | 204/195 P |
| 3,542,662 | 11/1970 | Hicks et al. | 204/195 P |
| 3,566,874 | 3/1971 | Shepherd | 128/348 |
| 3,795,239 | 3/1974 | Eberhard et al. | 204/195 B |

*Primary Examiner*—T. Tung
*Attorney, Agent, or Firm*—Knobbe, Martens, Olson, Hubbard & Bear

[57] ABSTRACT

A sensor for in vivo amperometric measurement of selected components, dissolved oxygen for example, of blood, cells and biological fluids generally and for general analytical use is disclosed. The sensor includes an electrode assembly which has a noble metal electrode covered with a thick hemispherical membrane consisting essentially of a sparingly cross-linked hydrophilic polymer hydrogel which reversibly dries and imbibes greater than 20% aqueous fluid while maintaining structural integrity. Hydrophilic polyhydroxyl ethyl methacrylate is the preferred polymer.

16 Claims, 3 Drawing Figures

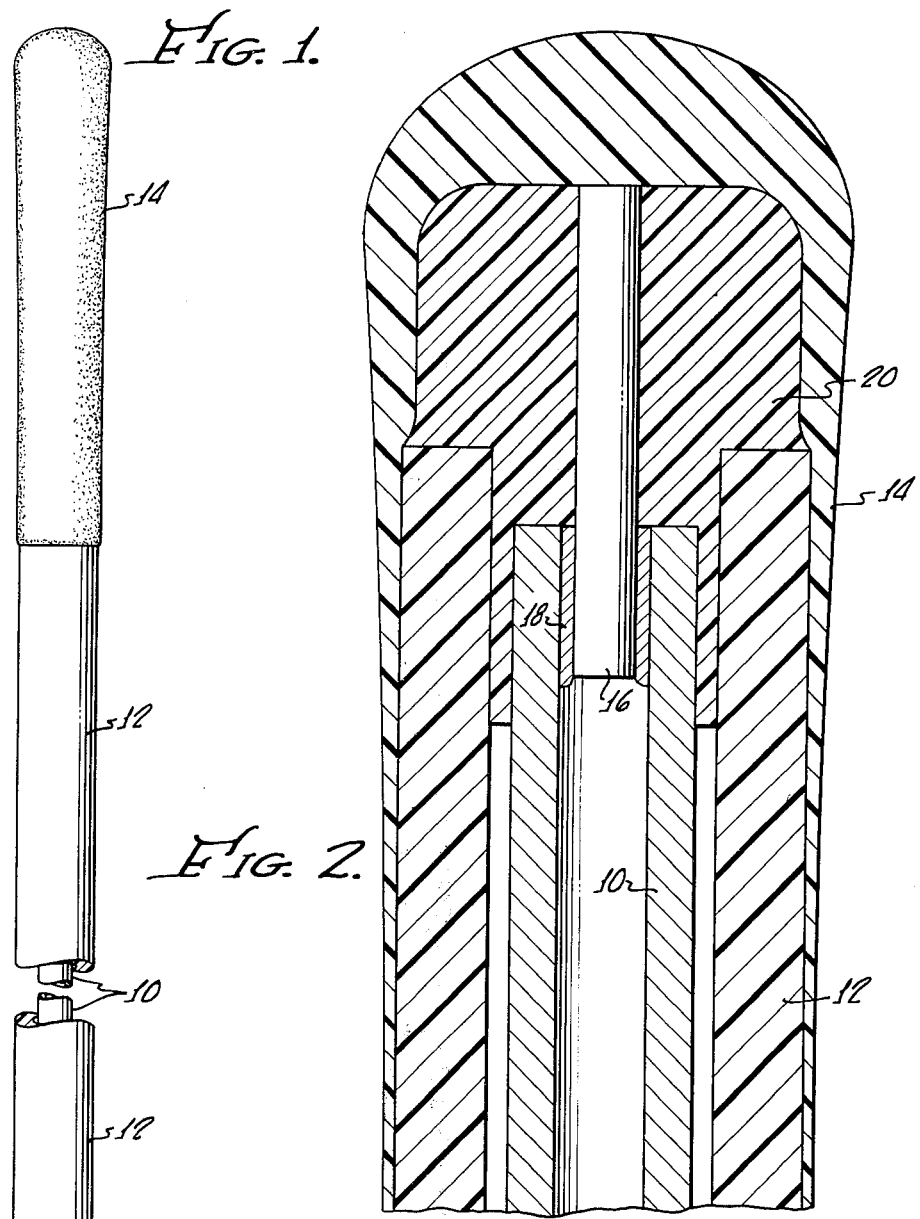
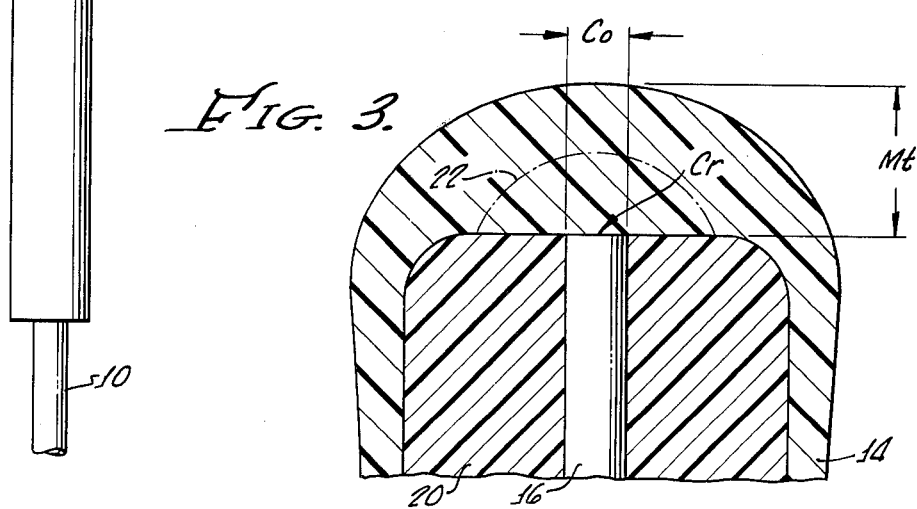

SENSOR

This is a continuation of application Ser. No. 216,445, filed Jan. 10, 1972, now abandoned.

RELATED APPLICATION

The patent application of Ruegg, et al. filed Jan. 10, 1972, entitled STERILE INSERTER APPARATUS, Ser. No. 216,455, now U.S. Pat. No. 3,757,771 describes an insertion tool with which the present invention may be used.

This invention relates to electrochemical analysis commonly referred to as amperometric analysis and sometimes referred to as polarographic analysis.

More specifically, this invention relates to a sensor which comprises an electrode assembly designed and constructed to have broad analytical applicability. One particularly valuable application of the invention relates to the in vivo measurement of oxygen tension or other constituents in blood, cellular matter, plants, etc.

The principles of polarographic analysis were first enunciated by Heyrovsky [1,2] (parenthetical numerals refer to references listed at the end of this specification.) and have been applied to a great many types of analysis [3]. The principles of polarographic electrochemical determination have been applied to biological in vivo measurements [4]. Early in vivo and biological measurements were made with electrodes normally constructed of platinum. Such exposed tip electrodes are subject to poisoning in the tissues and, in general, have not been satisfactory for in vivo measurements [5]. It has been reported that gold microelectrodes are more satisfactory [5], but such electrodes have limited applicability. Clark [6,7,8] developed an electrode assembly in which the noble metal electrode was covered with a membrane which was permeable to the cell or fluid constituent which was to be measured. Most electrode assemblies intended for the measurement of constituents of biological fluids or systems have followed the principles of the Clark electrode.

Oxygen measurement in biological fluids and cells using membrane covered electrodes of several different types have been reported [9-17].

Electrode membrane materials which have been reported include polyethylene, Silastic silicon polymer, rubber, polyvinyl chloride, [6] collodion [13,17], Teflon polytetrafluoroethylene [14-16], and other oxygen pervious materials [12] including certain hydrophilic membranes such as cellophane, collodion, cellulose acetate, and other materials [9] have been reported. The reader is referred to the substantial volume of patent and journal publication literature for other types of membrane materials which have been described.

A strongly hydrophilic hydrogel polymer material has been developed by Wicherle and Lim [18,19]. One form of this material is sold under the trademark HYDRON and has exceptional compatibility with human blood and tissue [20,21].

The electrode assemblies of the prior art in which the electrode was separated from the fluid under test by a hydrophilic membrane have not been entirely satisfactory, in part because of the diffusion characteristics of the membranes and in part because of the lack of structural integrity of these membranes. The hydrophilic membranes of the prior art tend to crack or are otherwise altered and their characteristics degraded, upon being dried, to such an extent that, upon re-exposure to aqueous media, the membrane is not suitable for electrochemical measurements or its characteristics have been so altered that reproducibility cannot be achieved. Membranes with these characteristics are referred to as irreversible membranes.

One of the advantages of the present invention is that the membrane is reversible, in the sense that it can be dried and, when exposed to an aqueous media, will imbibe water or aqueous solution to a very high degree, 20 to 97 percent for example, without loss of structural integrity and without substantial alteration of diffusion or other characteristics.

Previous work with membranes has been focused upon thin membrane systems. In general, it was believed that thinner membranes had superior diffusion characteristics and were preferred for electrochemical measurements. Workers generally sought to make the membranes as thin as possible while maintaining necessary structural integrity. Thick membranes were considered undesirable and have been avoided.

One of the surprising features of this invention is the discovery that thick membranes have certain advantages, that there is a critical thickness range which gives optimum diffusion and electrochemical characteristics along with high structural integrity and abrasion resistance.

Previous workers have generally sought to make the membrane covering for the electrode as uniformly thin as possible. According to the present invention, there are unexpected and significant advantages in thick membranes which are generally hemispheric in configuration in the area of diffusion. Such membranes have excellent diffusion characteristics, provide sensitive and reliable electrochemical measurements, are tough, resistant to abrasion and have superior structural integrity.

In electrochemical measurements in in vitro systems the size of the electrode is generally of secondary importance. Where in vivo measurements are desired, however, electrode assembly size is of primary importance along with necessary strength, flexibility and resistance to damage. One of the advantages of the present electrode system is that catheters embodying the electrode assembly having very small diameters, in the range of from about 0.012 inch to about 0.04 inch (or larger if desired) can be made on a production line basis. Such catheters are highly resistant to damage during handling and use, have high accuracy and reproducible electrochemical characteristics.

These and other advantageous characteristics will be more fully discussed in the specification which follows in which reference is made to the drawings.

In the drawing, FIG. 1 is a broken view of a catheter constructed according to the principles of this invention, FIG. 2 is an enlarged sectional view of the end portion of the catheter showing the electrode assembly embodied in the catheter, and FIG. 3 is an enlarged sectional view of the tip of the electrode assembly which will be referred to for discussion of certain principles involved in the invention.

The reader is referred to the selected background references listed at the end of this specification, which are incorporated herein by reference, to texts and treatises describing electrochemical measurements and to the extensive literature related to amperometric or polarographic measurement for complete background discussions relating to the principles of measurement involved in this invention.

Briefly, the class of amperometric sensors (also referred to as polarographic sensors), which are of interest here and of which the present invention is an improvement are characterized by the following design features. A cathode and an anode, in contact with a body of electrolyte solution, are so mechanically disposed that the cathode has all of its effective surface in close proximity to the inner surface of a semi-permeable membrane. A selected electrical potential is applied between the cathode and the anode (or developes due to the intrinsic nature of the system) which is insufficient in magnitude to cause electrolysis of the electrolyte. The polarity of this potential is chosen such that the electrode which is in close proximity to the semi-permeable membrane becomes polarized, after passage of an initial charging current, and essentially no current flows in the system. When the exposed surface of the semi-permeable membrane is placed in contact with a sample containing a constituent capable of migrating through the membrane and reacting, by oxidation or reduction for example, at the potential of the polarized electrode, the component diffuses through the membrane and reacts to de-polarize the electrode in amount proportional to the concentration or partial pressure of that component in the sample. The resultant current flow between the electrodes is also proportional to the concentration or partial pressure of the constituent being sensed and, through appropriate calibration, can be read on a meter, graph or other output device in terms of the concentration, partial pressure, etc., of the constituent being measured.

The Clark oxygen sensor (6) is a classical example of a device which functions in this manner. In the Clark sensor, a silver anode and a noble metal cathode are arranged in such a manner that the cathode, which is polarized to a voltage of −0.6 to −0.9 volts, is pressed against a plastic or rubber membrane. When the sensor is exposed to a sample containing oxygen, the oxygen diffuses through the membrane and is reduced at the cathode according to the following overall reaction:

(a) 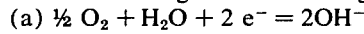 $\frac{1}{2} O_2 + H_2O + 2 e^- = 2OH^-$

Actually, the reaction which takes place is believed to occur in two steps, as follows:

(b) 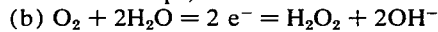 $O_2 + 2H_2O = 2 e^- = H_2O_2 + 2OH^-$
(c) 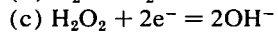 $H_2O_2 + 2e^- = 2OH^-$ Of less significance, but completing the circuit, is the reaction which takes place at the silver anode (when, for example, sodium chloride solution is the electrolyte) which is as follows:

(d) 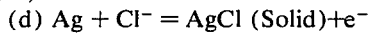 $Ag + Cl^- = AgCl (Solid) + e^-$

Sensors of this type have been used to a limited extent for many years, especially in such fields as the clinical determination of dissolved oxygen in blood, the monitoring of oxygen in respiratory gases, or the measurement of dissolved oxygen profiles in lakes and streams. However, the more widespread use has been limited by the effects on their performance on a number of critical factors related to their mechanical design, assembly and maintenance. Of these factors, the most important are those concerned with the establishment and maintenance of a stable close-spaced mechanical relationship between the surface of the sensor cathode and the inner surface of the gas permeable membrane. The stability of this spacing determines the stability of the steady-state diffusion gradient of oxygen, or the constituent being measured, which exists from the sample to the cathode during sensor operation. (In this discussion and throughout this specification, repeated reference will be made to the determination of oxygen because of the great advantages of the present invention in oxygen determinations and because of the importance of oxygen determinations. However, this invention is not limited to oxygen determination from a technical point of view and no such limitation is intended with respect to the present patent.) The constancy of this diffusion gradient directly determines the stablity of a signal level for a given oxygen partial pressure or constituent concentration or partial pressure and the thickness of the diffusion zone determines the response time of the sensor. Thus, a loose membrane causes slow and unstable response, and the calibration of the sensor becomes quite unreliable.

Since the appearance of the original Clark sensor, several modifications or improvements of the design have been patented. See, for example, U.S. Pat. Nos. 3,406,109; 3,278,408; 3,260,656; 3,239,444; 3,227,643; 3,098,183; 3,088,905; and 3,000,805. (These patents are selected as examples of the prior art and no representation is made or intended that these are more relevant than other prior art patents and publications or that these are representative of the prior art.)

While these designs all represent advances in the state of the art, most of these designs have retained, as a basic feature, a fixed mechanical relationship between the anode and the cathode and require that the semi-permeable membrane be mounted on the sensor by some independent means during the process of assembly of the sensor prior to its use.

Polarographic measurement of oxygen partial pressure has become very common in the industry as well as the medical field. In later work by Dr. Clark with his invention of the polargraphic oxygen electrode, the anode and the cathode of this electrode were placed behind gas permeable hydrophobic membranes. In the course of Dr. Clark's earlier development of the oxygen electrode (6,7,8) he found that blood caused the bare platinum cathode to become insensitive. Later, Clark found that be covering the platinum surface with a thin film of cellophane he could measure the partial pressure of oxygen for a longer period of time. Using this technique he was able to measure pO₂ of the various tissues in the body which are being perfused with heparinized blood as well as arterial and venous blood. However, because of the inconvenience of this type of measuring device and the lack of suitable materials, furhter development on this type of device was not pursued. In later work by Dr. Clark on his polarographic oxygen electrode, both the anode and the cathode were placed behind a gas permeable hydrophobic membrane.

With the advent of a new hydrophilic polymer, polyhydroxyl ethyl methacrylate (18–21), a new and fresh approach to membrane covered electrode assembly design has been made possible.

This polymer has characteristics which are very unique and which have opened up new and different approaches to the development of polarographic sensing devices and in the determination of oxygen in biological systems.

This acrylic polymer is compatible with blood and exhaustive tests have shown it to be non-thrombogenic. It imbibes water to about 30 percent or more by weight in its cured state, is tough and physiologically compatible. Devices made of or incorporating this material have caused little or no irritation to tissue surrounding this polymer.

The sensor described herein is made possible by reason of the special characteristics possessed by this material. In general, the sensor assembly includes a metal electrode, supporting structure for the electrode. (The term supporting structure as used herein includes both physical supports for the electrode and such supporting electrical circuit elements as are necessary to permit the electrode to be mounted and connected to appropriate measuring equipment.) The sensor assembly includes a selectively permeable membrane covering the electrode to prevent direct contact of the fluid to be tested with the electrode and to permit selected constituents of the fluid to migrate through the membrane for electrochemical reaction at the electrode.

The membrane preferably consists essentially of a hydrogel of a sparingly cross-linked hydrophilic polymer and about 20 to 97 percent of an aqueous liquid. The polymer is a copolymer of a major amount of a polymerizable monoester of an olefinic acid selected from the group consisting of acrylic and methacrylic acid which has a single olefinic double bond, and a minor amount of a polymerizable diester of one of said acids, the diester having at least two olefinic double bonds. The monoesters and diesters are water soluble and the monoester has a hydrophilic functional group.

The most outstanding species of this class of materials is polyhydroxyl ethyl methacrylate sold under the trademark HYDRON by Smith and Nephew Associated Companies Ltd. in England and by National Patent Development Corporation in the United States, including their subsidiaries and licensees. The preferred class of the compounds previously identified are those in which at least one of the monoester and the diester is an ester of an polyhydric alcohol selected from the group consisting of ethylene glycol, propylene glycol, polyethylene glycol, polypropylene and polyvinyl alcohol.

The reader is referred to Wicherle and Lim patents, U.S. Pat. Nos. 2,976,576 and 3,220,960, which are incorporated herein by reference, for a complete discussion of the membrane hydrogel materials used in the electrode assembly of this invention. Briefly, hydrogels are produced by copolymerizing a hydrophilic monomer capable of forming a linear, or partly linear polymer in aqueous solution and, with a cross-linking agent, cross-linking in amounts small enough to yield an elastic, soft, transparent hydrogel. The starting materials include the esters of acrylic and the methacrylic acids with alcohols which have a hydrophilic group and which after polymerization impart hydrophilic properties to the polymer. A major portion of the monoester of acrylic or methacrylic acid and a bifunctional alcohol, which has an esterifiable hydroxyl group and at least one additional hydrophilic functional group, is compolymerized in aqueous solution with a small amount of a diester of these acids and of an alcohol which has at least two esterifiable hydroxyl groups until a shape retaining body is retained.

In practice, the linear polymer is obtained from one of the previously indicated sources in the form of a powder, is dissolved in an alcoholic solution, (methyl alcohol being preferred) along with a cross-linking catalyst, and is applied in thin coatings to the probe surfaces. The cured coating over the cathode then becomes the diffusion membrane for the sensor, i.e., the membrane prevents direct contact of a cathode with blood or other biological fluid (term fluid includes both flowing fluids and cellular fluids) or other non-biological fluids, e.g., lake water, etc., and yet permit diffusion of the component to be measured, e.g., oxygen, through the barrier membrane to the cathode. Unlike cellophane, in which a mechanical fastening device was required, this new polymer membrane is made to adhere directly to the probe body and is tough enough to withstand normal abrasions found in intravascular use, it is, of course, of great importance that the membrane makes the sensor compatible with physiological environments, especially blood, A significant additional advantage is that, because the membrane can be applied as a solution in the form of thin or thick films, the electrode assembly can be made in extremely small sizes, in the form of a catheter or probe, for insertion into blood vessels, cellular matter, etc. It has been possible to reduce the outside diameter to the probe to as small as 0.012 inch and smaller probe sizes are possible if desired.

The preferred cathode is pure gold wire which is attached to an elongate conductor, the conductor forming part of the electrode support assembly. Other metals, the noble metals such as platinum, pallidium, etc. being preferred can also be used as the cathode. The conductor with the electrode conductively connected thereto is covered with a Teflon polytetrafluoroethylene or other physiological inert, electrically insulating material. This may be done by coating the material or bypassing the conductor through small Teflon tubing. The conductor, in the preferred embodiment, is a fine stainless steel tube. The gold wire is potted in a thermosetting resin and expsed by careful grinding. The whole of the tip of the assembly is subsequently coated with the hydrophilic polyhydroxyl ethyl methacrylate and the hydrophilic polymer is cured. The probe is then checked for sensitivity and response time.

A complete electrode in the form of a catheter, is illustrated in FIG. 1. The electrical conductor 10, in this embodiment, stainless stell tube, but no particular form of conductor is necessary or critical. The tube is covered with or enclosed in a Teflon coating 12, or other electrically insulating and physiologically inert coating. The tip of the electrode is coated with the membrane material, shown at 14.

The tip construction is shown in detail in FIG. 2 in which the electrode 16 in this embodiment is a solid gold wire, is secured by a solder or weld bead 18 of an electrically conductive material to the stainless steel tube 10. Any electrical connection between the cathode and the tube will be satisfactory for many uses. The stainless steel tube provides a conductive support assembly to permit connection of the electrode to an appropriate measuring instrument. The electrode 16 is encased in an electrically insulating material, such as an epoxy resin, shown at 20 and the entire tip of the electrode is coated with the membrane material 14.

The membrane is compatible with water and, in fact, imbibes from about 20 to about 97 percent, typically approximately 30% in a cured polymer, by weight of water or aqueous solution.

The reduction of oxygen at the cathode in oxygen measurement, is shown by the following equation:

(e) $O_2 + 4e^- + 2H_2O = 4\ OH^-$

The reduction process, not only reduces oxygen but also uses water in its reaction, an important consideration in the use of this invention for oxygen measurement.

When the cathode is polarized with approximately −0.7 volts, the oxygen population at the cathode surface approaches zero. Since water and oxygen react at the cathode surfaces, there will exist a concentration gradient between the outside surface of the electrode, indicated at $Co$ in FIG. 3. and the cathode surface, indicated at $Cr$ in FIG. 3. The distance $Mt$ is shown as the thickness of the membrane, measured perpendicularly from the flat surface of the tip of electrode 16. This gradient due to depletion of the water at $Cr$ results in a "pumping" of water toward the cathode $Cr$. Since the oxygen is dissolved in the water the transport of oxygen is accelerated between $Co$ and $Cr$, resulting in a faster response to oxygen changes at $Co$.

A further factor in the diffusion process through the membrane is the absence of macro voids or passages which may be filled with oxygen. Because of the accelerated transport of oxygen through the pumping action and the absence of macro voids or passages, the cathode response to oxygen changes outside the membrane $Co$ is substantially faster than with other types of membranes. This, in turn, allows the use of relatively thick membranes while maintaining the fast response to oxygen (or other constituent) changes at $Co$.

The amount of oxygen reduced at the cathode is determined principally by the cathode area, the membrane thickness, the membrane transport constant and the solid angle through which the oxygen diffuses. If the membrane thickness covering the cathode is small compared with the diameter of the cathode then the solid angle of diffusion and the effective area of oxygen entry into the membrane is equal or substantially equal to the cathode area. If the membrane thickness is equal to or greater than the cathode diameter then the solid angle can approach 180°. Until the three dimensional hydrophilic polymer used in this invention was available, neither the thick membranes nor wide angle diffusion of gases through membranes was practical. The conventional membrane, 0.010 inch thick would have exorbitantly long response to oxygen changes at $Co$. Also, very little side diffusion to the cathode could be expected.

The three dimensional polymer membrane decribed herein makes possible the following substantial advantages over previous electrode assemblies.

First, the membrane can be case on the cathode surface with strong adhesive force, thus insuring consistent, reproducible and predictable cathode-membrane relationships.

Secondly, the thick membranes which are cast can include other constituents which may be desirable in given systems and which do not substantially alter the physical or electrochemical characteristics of the membrane. For example, the membrane can include antibiotics, hormones, buffers, etc.

Thick membranes can be cast which have a very large active area, with respect to a small cathode.

Increasing the membrane thickness decreases the total current at the electrode $Cr$ and, in turn, decreases the total current at the surface of periphery of the membrane $Co$.

With increasing membrane thickness, the surface area of $Co$ increases by the square of the thickness of membrane, as measured from the cathode.

These features, in turn, make possible a very low oxygen diffusion rate per unit surface area at the periphery or surface of the membrane, $Co$. The membrane can be made so as to make possible accurate measurements in biological tissue, botanical growth, and in other environments where high diffusion rates would create such concentration gradients near the surface of the membrane $Co$ as to give erroneous measurements.

It was believed, at the outset of the project which resulted in this invention, that membrane thicknesses should, as the prior art taught, be kept to a minimum and that the membrane thickness should be uniform.

It was discovered, quite surprisingly, that the electrode current did not decrease rapidly as the thickness of the membrane was increased, but, quite unexpectedly, actually increased as the membrane thickness $Mt$ was increased, up to a certain thickness after which there was a decrease in electrode current, all other conditions remaining constant. Accordingly, it was determined that the electrode should, for certain desired properties, be separated from the test solution in which a constituent is being measured by a membrane thickness $Mt$ of from about 0.004 inch to about 0.020 inch in thickness, the optimum thickness being about 0.010 to 0.012 inch, with a 0.004 inch electrode.

No mathematical explanation for the observed phenomenon has been fully developed, however, it is presently believed that the electrode generates, in a system wherein current is flowing, a zone of oxygen (or other constituent being measured) concentration a distance from the electrode which is approximately equal to the concentration of oxygen (or other component) in the fluid which is being measured at the periphery of the membrane, $Co$. This zone which is referred to as an "equal concentration" zone is indicated generally at 22 in FIG. 3, no particular significance being ascribed to the illustrated shape of the zone or the distance of the zone from the electrode to the surface of the membrane $Co$.

It may be predicted as the thickness of the membrane increases to the point where the membrane thickness is equal to the distance from the electrode to the equal concentration zone (assuming a general correlation between the shape of the equal concentration zone and the shape of the membrane surface which is generally hemispherical) the rate of oxygen reduction at the electrode surface $Cr$ and consequently the current flow will increase. Once the membrane thickness begins to exceed the distance from the electrode surface to the equal concentration zone 22, then it may be predicted that there will be a decrease in current concentration because the concentration gradient between the equal concentration zone 22 and the surface of the membrane $Co$ approaches zero. In this condition, it is believed, the equal concentration zone is essentially in a state of equilibrium, i.e., for every molecule of oxygen which migrates to the cathode surface $Cr$, a molecule of oxygen migrates to the equal concentration zone from the membrane surface $Co$. Since the area of the equal concentration zone is substantially larger than the area of the cathode, the flux of migrating constituents, e.g., the oxygen, is considerably less dense at the equal concentration zone than at the cathode. Likewise, as the surface of the membrane $Co$ is made larger than the surface of the equal concentration zone, by increasing the thickness of the membrane, the migration flux of the species being measured at the surface of the membrane $C_o$ increases. Of course, with extremely thick membranes, the sensitivity of the electrode is decreased and the response time is increased because of the increasing distance from the surface of the membrane $C_o$ to the equal concentration zone.

It has been determined, by microscopic thickness measurements and performance tests, that optimum membrane thickness, for herispherical membranes over a flat exposed circular electrode of the type shown in the drawing, is from about two to about three or three and one-half times the diameter of the electrode. Thus, for an electrode diameter of 0.004 inch (a typical design for use in catheter configuration) the optimum membrane thickness, measured perpendicularly from the electrode surface, is about 0.010 to 0.012 inch, in the case of the oxygen measurement in blood. The optimum thickness will, of course, be a function of the membrane transport constant of the species being measured, but for most commonly determined species the optimum thickness will fall within the two or three and one-half times electrode diameter range given above. Membrane thickness from about one to about five to eight times electrode diameter (or even higher in some instances) exhibit the advantageous characteristics described and approximate minimum and maximum thicknesses for the hemispherical membrane - flat electrode configurations are under consideration.

Of course, the advantages of reversibility without loss of physical and electrochemical characteristics, application to small electrode assemblies, compatibility, etc., are achieved using the membrane material in typical thin membrane configurations, which would be the same as illustrated except that the membrane would be of uniform thickness across the exposed surface of the electrode and from as little as 1/100th (or even less in the case of large electrodes) to one-half (or even greater in the case of small electrodes) the electrode diameter. The invention in one facet, then is not limited to hemispherical or thick membranes covered electrodes.

Electrodes having diameters as small as 0.001 inch have been constructed and tested and even smaller electrodes can be made using known micro-fabrication techniques, i.e., by using finely drawn and/or tapered electrode wire and careful grinding away of the epoxy potting under a microscope. The same techniques used in making larger electrode sizes is used, with modification to accomodate smaller objects. There is no maximum size for electrodes and electrodes having diameters as large as 0.020 inch have been quite satisfactory. The limitation on maximum size electrodes is one of practical handling and of diminishing increase in sensitivity. Once a given diameter is reached, this diameter being a function of the system in which the measurement is to be made, then no improvement results from using a larger electrode. The generally advantageous range of electrode diameters is from about 0.001 to about 0.020 inch.

The precise characteristics of the membrane will be to some extent dependent upon the application and curing of the membrane polymer material, as is characteristic of any polymer system, but by duplication of process variables and adherence to processing specifications supplied by the vendor of the polymer the advantages of the present invention, including high reproducibility of electrochemical and physical characteristics, are obtained.

The polymer is obtained in linear form as a powder and dissolved in alcohol, ethyl alcohol or methyl alcohol being highly suitable. Methyl alcohol has been used most extensively. One form of the soluble linear polymer is under the trademark HYDRON S (M.W. = 260,000, viscosity = 0.6428 at 25° in Dimethyl formamide) by National Patent Development Corporation (including its subsidiary licensees). Processing of this polymer material has been described by Tollar, et al. (22), incorporated herein, along with the references cited by Tollar, et al. Briefly, the polymer is applied, typically by repeated dipping and evaporation in a methanol solution containing less than about 5 percent water and up to about 20 percent polymer, typically in the 1 to 10, e.g., 5, percent polymer, by weight, concentration range. The methanol - polymer solution may contain traces, e.g., up to 0.5 percent, of a cross-linking catalyst of the types referred to in the literature (18–22), e.g., persulfates, dichromates, (in the form of typical salts, e.g., sodium, potassium, etc.,) peroxides, etc., which promote cross-linking upon activation by typical methods, e.g., application of heat and/or ultraviolet radiation, etc. It is usually desirable to stress relieve the polymer body by heating it to the 100°C range for several minutes. Exact processing conditions are given by the supplier of the material to account for long term variations in properties, degree of pre-polymerization, etc., and should be adhered to. Alternatively, optimum properties for specialized applications can be obtained through routine variation of the parameters discussed above and in the patent and publication literature.

The electrode assemblies of this invention are used in the manner commonly applied to amperometric measurements. In a flowing or still body of fluid, the reference electrode, e.g., calomel, silver-silver chloride, etc., and the measuring electrode assembly of this invention are placed in contact with the fluid, typically by simple immersion. The electrodes are connected to a galvanometer or polarographic instrument and the current read or recorded upon application of the desired voltage application between the electrodes. For oxygen determination, voltages from about −0.3 to −0.9, typically about −0.6 volts, are used according to known polarographic and amperometric principles (1–17).

The electrode assembly of this invention in the form of a catheter is inserted into the vein or artery, or into cellular tissue, using typical sterile techniques. For example, the catheter form of electrode assembly can be used with the Sterile Inserter Apparatus of the Ruegg, Spracklen and Cheatham application, filed concurrently herewith referred to previously, or with conventional inserter apparatus, such as that manufactured by Deseret Pharmaceutical Co., Inc., Sanday, Utah, under the trademark E-Z CATH. The electrode assembly has been extensively tested and has given superior performance when used in connection with the IBC Model No. 145-071 Multi-Purpose Differential Oxygen Analyzer, sold by International Biophysics Corporation, Irvine, California, but may be used with equally superior results with any high quality amperometric instrument. The catheter electrode assembly can be used with any standard reference electrode and has given excellent results when used with the BIOSENOR electrode sold by International Biophysics Corporation.

Of course, the use of the electrode assembly is not restricted to use with the aforementioned instruments nor is it restricted to oxygen determinations, being useful for metal determination, e.g., iron, cerium, cadmium, etc., according to known principles and techniques, se, for example, reference (3). The invention is set forth in exemplary from and is not intended to be limted by the examples, either as to construction or usage.

SELECTED BACKGROUND REFERENCES

1. Heyrovsky, J., *Polarographie*, Springer, Vienna, 1941.
2. Heyrovsky, J. in *Physicalishe Methoden der Analytischen Chemie*, W. Bottger, Ed., Vol. II, Akademishe Verlagsgellschaft, Leipzig, 1936.
3. Kolthoff, I.M. and J.J. Lingane, *Polargraphy (Second Ed.)*, New York: Interscience Publishers, Inc., 1952.
4. Davies, P.W. and F. Brink, *Microelectrodes for measuring local oxygen tension in animal tissues*, Rev. Sci. Instr. 13: 524–533, 1942.
5. Jamieson, Dana and H.A.S. van den Brenk, *Electrode Size and Tissue $pO_2$ Measurement in Rats Exposed to Air or High Pressure Oxygen*, J. Appl. Physiol. 20 (3): 514–518, 1965.
6. Clark Jr., L.C., U.S. Pat. No. 2,913,386, Nov. 17, 1959.
7. Clark, L.C., J.A. Helmsworth, S. Kaplan, R.T. Sherman, and Z. Taylor, *Polarographic Measurement of Oxygen Tension in Whole Blood and Tissues During Total By-Pass of the Heart*, Surgical Forum, Harris, P.D., S.I. Schwartz, and E.B. Mahoney, *Platinum Microelectrode Unit for Measuring Tissue Oxygen Tension*, Surgery, 47 : 962, 1960.
8. Clark Jr., L.C., *Monitor and control of blood and tissue oxygen tensions*, Trans. Am. Soc. Artificial Internal Organs 2:41–48, 1956.
9. Leonard, J.E. and J.A.R. Kater, Canadian Pat. No. 808,789, Mar. 18, 1969.
10. Charlton, G., David Read, and John Read, *Continuous intra-arterial $pO_2$ in normal man using a flexible microelectrode*. J. Appl. Physiol. 18(6): 1247–1251, 1963.
11. Charlton, G., *A microelectrode for determination of dissolved oxygen in tissue*. J. Appl. Physiol., 16(4): 729–733, 1961.
12. Bicher, II. I., and M.H. Knisely, *Brain tissue reoxygenation time, demonstrated with a new ultramicro oxygen electrode*. J. Appl. Physiol. 28(3): 387–390, 1970.
13. Whalen, W.J., J. Riley, and P. Nair, *A microelectrode for measuring intracellular $pO_2$*. J. Appl. Physiol., 23(5) 798–801, 1967.
14. Moran, Francis, Louis J. Kettel, and David W. Cugell, *Measurement of blood $pO_2$ with the microcathode electrode*. J. Appl. Physiol., 21(2): 725–728, 1966.
15. Kreuzer, F., E.D. Harris, Jr. and C. G. Nessler, Jr., *A method for continuous recording in vivo of blood oxygen tension*. J. Appl. Physiol., 15(1): 77–82, 1960.
16. Carey, Francis G., and John M. Teal, *Response of oxygen electrodes to variables in construction, assembly, and use*. J. Appl. Physiol., 20(5): 1074–1077, 1965.
17. Tsao, Madepeace U., and Atilla Vadnay, *An electrode for continuous measurement of transient blood $pO_2$ in the vessel*, J. of Appl. Physiol. volume 15: 712–716 (1960).
18. Wicherle, O., and D. Lim, U.S. Pat. No. 2,976,576, Mar. 28, 1961.
19. Wicherle, O., and D. Lim, U.S. Pat. No. 3,220,960, Nov. 30, 1965.
20. Simpson, B.J., *Hydron: A Hydrophilic Polymer*, BioMedical Engineering, 4:65, 1969.
21. Singh, M.P. *Hydron In the Right Atrium*, Bio-Medical Engineering, 4:68, 1969.
22. Tollar, M., M. Stol and K. Kliment, *Surgical Suture Materials Coated with a Layer of Hydrophilic Hydron Gel*, J. Biomed. Mater. Res., 3: 305–313, 1969.

What is claimed is:

1. In an electrode assembly which includes an electrode, supporting structure for the electrode and a selectively permeable membrane covering the electrode to prevent direct contact of fluid to be tested with the electrode and permit selected constituents of the fluid to migrate through the membrane for electrochemical reaction of the electrode, the improvement wherein the membrane consists essentially of hydrophilic polyhydroxyl ethyl methacrylate.

2. In an electrode assembly which includes an electrode, supporting structure for the electrode and a selectively permeable membrane covering the electrode to prevent direct contact of fluid to be tested with the electrode and permit selected constituents of the fluid to migrate through the membrane for electrochemical reaction at the electrode, the improvement wherein the membrane consists essentially of a hydrogel of a cross-linked hydrophilic polymer and of 20 to 97 percent of an aqueous liquid, said polymer being a copolymer of a major amount of a polymerizable monoester of an olefinic acid selected from the group consisting of acrylic and methacrylic acid, said monoester having a single olefinic double bond, with a minor amount of a polymerizable diester of one of said acids, said diester having at least two olefinic double bonds, said monoesters and diesters being water soluble, said monoester having a hydrophilic functional group.

3. The improved electrode assembly defined in claim 2 wherein at least one of said monoester and of said diester is an ester of a polyhydric alcohol selected from the group consisting of ehtylene glycol, propylene glycol, polyethylene glycol, polypropylene glycol and polyvinyl alcohol.

4. An electrode assembly in vivo electrochemical measurements which comprises an electrode, supporting structure for the electrode and a thick hydrogel membrane covering the electrode to prevent direct contact of the fluid to be tested with the electrode and to permit selected constituents of the fluid to be tested to migrate through the membrane for electrochemical reaction at the electrode, the hydrogel consisting essentially of a cross-linked hydrophilic polymer, said polymer being capable of reversibly being dried and of imbibing from 20 to 97 percent of an aqueous liquid without loss of structural integrity and consisting essentially of a hydrogel of a cross-linked hydrophilic polymer and of 20 to 97 percent of an aqueous liquid, said polymer being a copolymer of a major amount of a polymerizable monoester of an olefinic acid selected from the group consisting of acrylic and methacrylic acid, said monoester having a single olefinic double bond, with a minor amount of a polymerizable diester of one of said acids, said diester having at least two olefinic double bonds, said monoesters and diesters being water soluble, said monoester having a hydrophilic functional group.

5. The improved electrode assembly defined in claim 4 wherein the hydrophilic polymer is polyhydroxyl ethyl methacrylate.

6. The improved electrode assembly defined in claim 5 wherein the membrane has a hemispherical configuration where the migration takes place.

7. The improved electrode assembly defined in claim 5 wherein the electrode has a flat surface covered by the membrane and the outer surface of the membrane is hemispherical in shape.

8. The improved electrode assembly defined in claim 4 wherein at least one of said monoester and of said diester is an ester of a polyhydric alcohol selected from the group consisting of ethylene glycol, propylene glycol, polyethylene glycol, polypropylene glycol and polyvinyl alcohol.

9. The improved electrode assembly defined in claim 8 wherein the membrane has a hemispherical configuration where the migration takes place.

10. The improved electrode assembly defined in claim 8 wherein the electrode has a flat surface covered by the membrane and the outer surface of the membrane is generally hemispherical in shape.

11. The improved electrode assembly defined in claim 8 wherein the membrane thickness is from about one to about eight times the diameter of the exposed electrode.

12. The improved electrode assembly defined in claim 11 wherein the membrane thickness is from about one to about five times the diameter of the exposed electrode, the exposed electrode is flat and has a diameter of from about 0.001 to about 0.020 inch, and wherein the membrane is in configuration where the migration takes place.

13. The improved electrode assembly defined in claim 4 wherein the membrane has a hemispherical configuration where the migration takes place.

14. The improved electrode assembly defined in claim 4 wherein the electrode has a flat surface covered by the membrane and the outer surface of the membrane is hemispherical in shape.

15. In an electrode assembly which includes an electrode, supporting structure for the electrode which leaves only the tip of the electrode exposed and a selectively permeable membrane covering the electrode to prevent direct contact of fluid to be tested with the electrode and permit selective constituents of the fluid to migrate through the membrane for electrochemical reaction at the electrode, the improvement wherein the membrane consists of essentially of a hydrogel material, having a thickness of from about one to eight times the diameter of the exposed electrode, the exposed electrode being flat and having a diameter of from about 0.001 to about 0.020 inch, the membrane being hemispherical in shape, being thicker in the center than at the edges.

16. The electrode defined in claim 15 wherein the thickness of the hydrogel membrane is from about one to about five times the diameter of the exposed electrode.

* * * * *

UNITED STATES PATENT OFFICE
CERTIFICATE OF CORRECTION

PATENT NO. : 3,912,614
DATED : October 14, 1975
INVENTOR(S) : Stanford B. Spracklen, Hideo Watanabe It is certified that error appears in the above-identified patent and that said Letters Patent are hereby corrected as shown below:

Inventor identification, change "Stanford B. Spracklen, San Juan; Hideo Watanabe Capistiano, Fullerton, both of Calif." to --Stanford B. Spracklen, San Juan Capistrano, Hideo Watanabe, Fullerton, both of Calif.--;

Column 4, Line 51, change "furhter" to --further--;

Column 12, Line 51, change "assembly in" to --assembly for in--.

Signed and Sealed this second Day of March 1976

[SEAL]

Attest:

RUTH C. MASON
Attesting Officer

C. MARSHALL DANN
Commissioner of Patents and Trademarks